Figure 1:
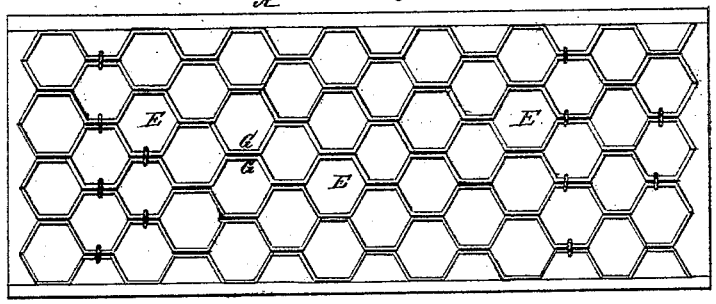

C. J. SIMMONS.
Egg-Carriers.

No. 142,952. Patented September 16, 1873.

Witnesses:

Inventor:
Courtenay J. Simmons
Per
Attorneys.

UNITED STATES PATENT OFFICE.

COURTENAY JAMES SIMMONS, OF KANSAS CITY, MISSOURI.

IMPROVEMENT IN EGG-CARRIERS.

Specification forming part of Letters Patent No. 142,952, dated September 16, 1873; application filed May 27, 1873.

*To all whom it may concern:*

Be it known that I, COURTENAY JAMES SIMMONS, of Kansas City, in the county of Jackson and State of Missouri, have invented a new and useful Improvement in Egg and Fruit Carrier or Packing-Case; and I do hereby declare that the following is a full, clear, and exact description of the same, which will enable others skilled in the art to make and use the same, reference being had to the accompanying drawing forming part of this specification.

The nature of my improvement consists in providing a tray and removable bottom with cells or rooms of hexagon shape for the reception of fruit or eggs, the cells being made of wire-net or stout card-board, stamped and blocked into hexagonal form, and are fitted into the frame or box and firmly glued together.

The peculiar shape of the cells or rooms in the frame or box, and the manner, hereinafter fully described, of building the cells into the frame or box, prevents unequal pressure and causes an equal pressure on all sides of the cell or room, thereby preventing the serious trouble caused by a square or round cell, there being in the last-mentioned too much pressure on one side or the other while in transit, causing much breakage and damage. My improvement, having an equal pressure on all sides, becomes self-supporting, and cannot possibly get out of shape to crush or damage the contents while in transit.

I will proceed to describe its construction, calling attention to letters of reference on the drawing.

Figure 2:
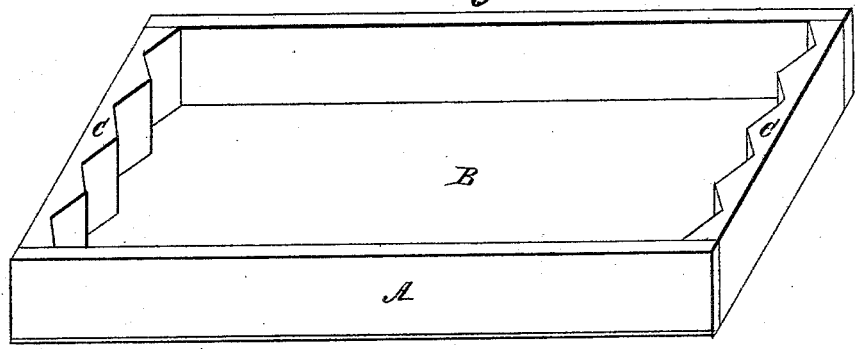
Figure 3:
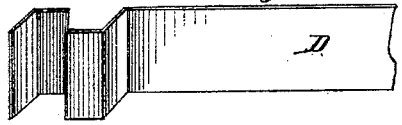
Figure 4:
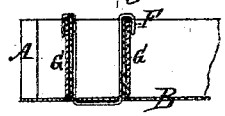

Figure 1 is a plan of the entire egg-holder. Fig. 2 is a perspective view of the case. Figs. 3 and 4 are detail views in elevation, the latter in section and the other not.

A is the frame or box for the reception of cells or rooms, being constructed of wood with a removable bottom; length of sides, twenty and a half inches, and two inches wide; length of ends, ten and three-eighths inches, and two inches wide. On the inside of end pieces I construct obtuse angles the entire width of board, as represented in Fig. C, to hold the end cells firmly in position, preventing any movement whatever. I then take a piece of wire-net or stout card-board the required size, six and three-quarter inches long and two inches wide, as represented by Fig. D, and stamp and block it into hexagonal form, which I call a cell or room, as represented by Fig. E. I then begin by building the cells or rooms into the box or frame, and gluing them together into position until my box or frame is filled, to the number of sixty cells or rooms in a box, forming the tray complete.

Two strips of card-board are bent into the requisite angles and creased upon the proper transverse lines, so as to correspond to each other. They are then matched together on edge and in the frame, so that they will serve as two halves to form a row of egg-cells. The opposite ends of each strip may then be glued in the obtuse-angled recesses of frame and the outer row also glued against the inner surface of the sides.

The bottom B is made of card-board, or other cheap and light material, while the bottom and cells may be jointly held in place by the U-shaped clamps F, both ends of which are passsed up through the former and bent over the top of the latter. This furnishes a very secure and stable fastening for the purpose, and at the same time one that is readily detachable when there is a necessity, in consequence of egg-fracture or other cause, to remove one or more of the rows of cells or the bottom. Each row of cells is thus made entirely independent of the others, and, being of sufficiently rigid material, exercises no side pressure.

Each cell being connected longitudinally with the next adjacent one by a double board side, G, no egg is subject to pressure in that direction. The danger of breakage is thus practically reduced to its minimum while the economy of cost is retained.

Having thus described my invention, what I claim as new, and desire to secure by Letters Patent, is—

1. A series of rows of cells having their ends fitted in obtuse-angled recesses on the inside of the end pieces of frame, and glued thereto, as and for the purpose set forth.

2. The U-shaped clamp F, applied to hold both bottom and cells in the manner specified.

COURTENAY JAMES SIMMONS.

Witnesses:
 JOSEPH C. RANSON,
 W. W. RIDER.